UNITED STATES PATENT OFFICE.

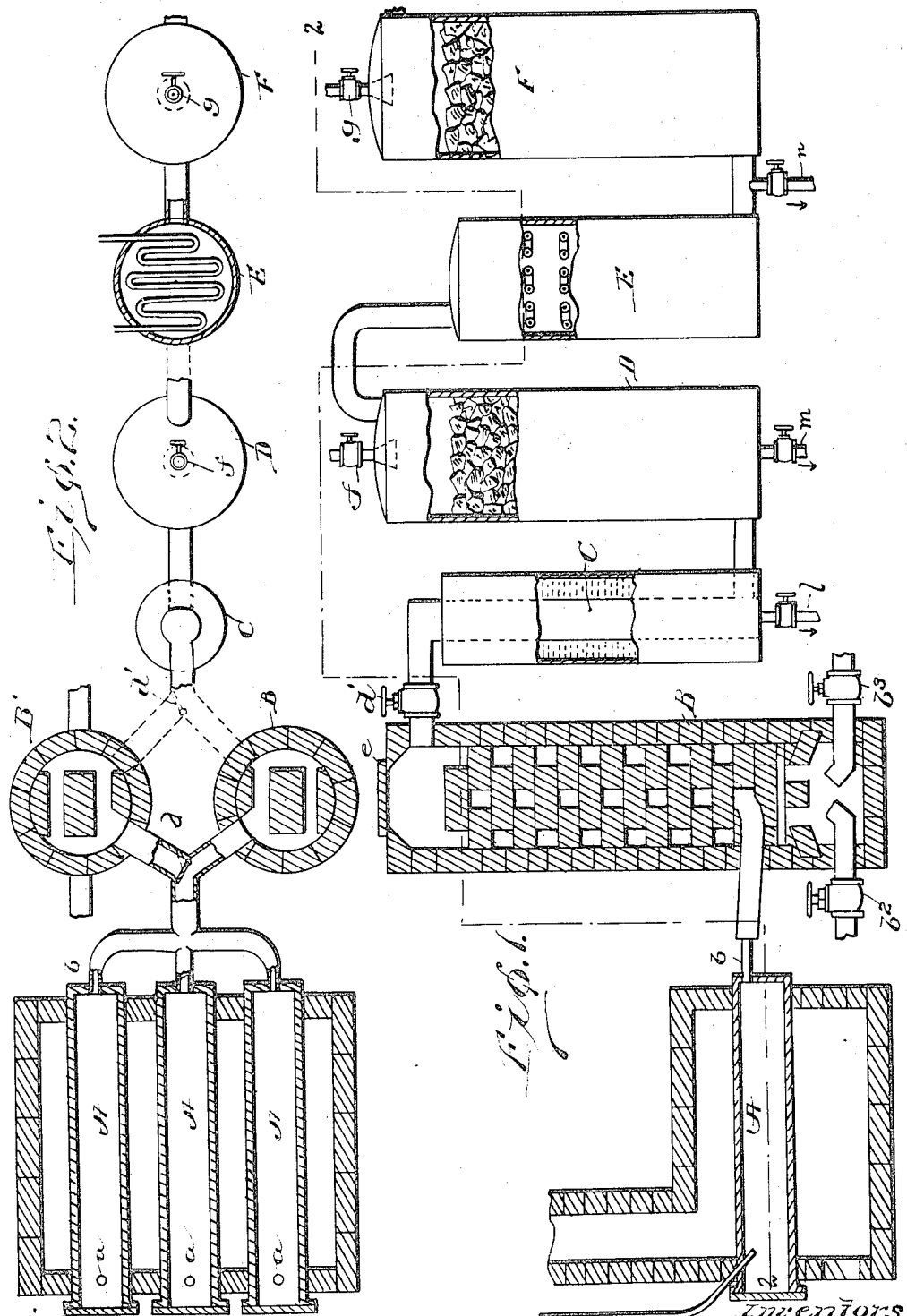

FREDERICK W. HUBER AND ROBERT W. POINDEXTER, JR., OF LOS ANGELES, CALIFORNIA.

UTILIZING BEET-MOLASSES WASTE WATER.

1,145,484.  Specification of Letters Patent.  Patented July 6, 1915.

Application filed July 21, 1914. Serial No. 852,325.

*To all whom it may concern:*

Be it known that we, FREDERICK W. HUBER and ROBERT W. POINDEXTER, Jr., both citizens of the United States, and both residing at Los Angeles, in the county of Los Angeles and State of California, have invented certain new and useful improvements in utilizing beet-molasses waste water resulting from the desugarization of beet-molasses by the Steffen or tricalcium-saccharate process, of which the following is a specification.

Our invention relates to the utilization of that residue or waste water, usually known and hereinafter referred to as "Steffen's water," which results from the desugarization of beet molasses by the well known Steffen process. The Steffen process effects the extraction of the sugar from the molasses in the following manner: The molasses is diluted till it has a sugar content of 7% and to this diluted molasses is added an amount of finely powdered quicklime equal to, or slightly in excess of, the total amount of sugar in the diluted molasses. The lime is added a little at a time, and mixed by mechanical agitation, with artificial cooling. In this way the sugar is made to combine with the lime in the form of an insoluble precipitate of tricalcium saccharate, from which the remaining solution, called Steffen's water, is filtered off. The tricalcium saccharate is subsequently treated so as to recover the sugar in pure form. The Steffen's water contains practically everything except the sugar which was present in the original molasses. Especially important are the organic nitrogen compounds and potash salts which it contains. Hitherto this Steffen's water has been either thrown away, or imperfectly utilized as a fertilizer, with or without concentration and admixture with other substances.

The object of our invention is to utilize Steffen's water much more completely and advantageously, by obtaining from it certain valuable products, namely: potassium salts, ammonia or ammonium sulfate and hydrocyanic acid.

The accompanying drawing shows an apparatus which is suitable for use in carrying out our improved process, but the process can be carried out, if desired, in apparatus very different from that illustrated.

In said drawing, Figure 1 shows a vertical section of a suitable apparatus, and Fig. 2, shows a plan view of the same, portions being shown in section.

Steffen's water is concentrated by evaporation until it has a specific gravity of from 1.3 to 1.4. It is then run, preferably warm, through pipes, $a$, $a$, $a$, on the accompanying drawing, into a system of retorts, A, A, A, in which it is heated in the absence of air, that is, destructively distilled. The retorts are heated by gas or any other fuel. These retorts may be of iron, fire clay or any other suitable material. The temperature of the retorts must be high enough for the organic compounds contained in the concentrated Steffen's water to be destructively distilled, so that gases and vapors containing ammonia and allied compounds are driven off with approximate completeness, and there remains in the retort a black mass, consisting essentially of ash mixed with carbon. A temperature of 500° C., has been found to give good results.

The retort gases are passed directly into one of two superheaters B, B, wherein the gases are highly superheated, which step converts a part of the nitrogen compounds, contained therein, into the form of hydrocyanic acid. These superheaters may be shells of iron or steel, lined with refractory material, and filled with blocks or pieces of a material which will resist the temperature of about 1,000° C., which it is necessary to use. It is generally necessary to have two superheaters, so that while one is being used to superheat the gases from the retorts, the other can be heated up preparatory to such use. Valves or dampers are provided at $d$ and $d'$ so that the retort gases may be made to pass through either B or B'. Thus the superheating is made continuous. The heating of the superheaters is accomplished by direct internal firing, using either gaseous or liquid fuel introduced for example at $b^2$ and a blast of air introduced for example at $b^3$. During the firing, the top valve $e$ is left open. When the gases and vapors from the retorts are passed through the superheater, the heat which has been stored up in the filling material is communicated to them by contact and radiation, and they are thereby heated to the high temperature necessary for the formation of hydrocyanic acid.

We have found that passing the gases through the superheater as rapidly as possible favors the formation of hydrocyanic acid, and also while it is well known that ammonia tends to dissociate into its elements at a temperature of 1000° C., this reaction is quite slow and we find that by passing the gases rather rapidly through the heater, no appreciable amount of the ammonia is dissociated, during the time it is subjected to the action of the superheater.

The hot gases from the superheater are passed through a cooler and tar separator, C, which removes from them tar and finely divided carbon. They are not cooled at this point to a temperature low enough to condense the water vapor which they contain, so that it, and all substances of an equal or greater volatility, pass on. The gases may be cooled to about 110° C. The gases are now passed in at the bottom of the tower D, which is constructed of, or lined with, an acid-proof material, and filled with acid-proof filling material, in such a way as to leave spaces for the passage of the gases. Sulfuric acid is sprayed in at the top of the tower through the sprayer $f$, in such a manner that it flows down and over the tower filling material and exposes a large surface to the ascending current of gases. By means of the sulfuric acid, the ammonia contained in the gases is absorbed, and converted into ammonium sulfate. This is drawn off in solution through the pipe $m$, and obtained in solid form by evaporating the solution. The temperature of D is kept sufficiently high to avoid the condensation of the water and hydrocyanic acid gas contained in the gas mixture, a temperature of about 110° C., being preferred.

The gases coming from D are passed downward through the cooler E, which may be of iron or steel, and which contains a system of refrigerating pipes adapted to cool the gases nearly to 0° C. In this cooler, most of the water and much of the hydrocyanic acid contained in the gas mixture is condensed, and the resulting solution of hydrocyanic acid in water flows out through the pipe $n$. The gases pass on to the tower F, which has for its object the removal of the remainder of the hydrocyanic acid. This tower may be similar in construction to the ammonia tower D, but does not need to be made of acid proof materials, as hydrocyanic acid is too weak to attack ordinary metals. Through the sprayer $g$, the ascending gases are washed with cold water, and the resulting dilute solution of hydrocyanic acid passes out through the pipe $n$, where it mixes with the solution from the cooler E. The dilute hydrocyanic acid may be concentrated in a column distilling apparatus or in other ways. The fact that we obtain hydrocyanic acid in liquid form by our process is of especial importance. Hitherto, when it has been necessary to use hydrocyanic acid in the arts, and especially in fumigation of fruit trees, it has been necessary to prepare it at considerable expense by treating a cyanid or ferrocyanid with an acid.

The gases passing out from F are combustible and may be used for heating the retorts, or the superheaters, or for any other purpose.

The black mass which remains in the retorts, after the volatile matter has been distilled off, is removed and treated with water in vats made of cement or other suitable material. In this way a solution is obtained which contains the potassium which was present in the original Steffen's water. Most of the potassium is in the form of the carbonate. This may be obtained in solid form by evaporating the solution or the solution may be neutralized with any suitable acid so as to give on evaporation the corresponding salt.

By means of the process we have described, we have succeeded in converting 55% of the nitrogen contained in Steffen's water into hydrocyanic acid, 26% of it into ammonia, and recovering over 90% of the potassium present in the Steffen's water in the form of carbonate, or other salts.

While the process has been described as particularly applied to the treatment of Steffen's water, we call attention to the fact that other suitable liquids, which may or may not be mixed with solids may be employed.

The treatment of the gases, by the method herein described, namely by passing the same through a checker work heated to about 1000° C., followed by cooling to a degree sufficient only to separate tarry matters, followed by treatment with acid to remove ammonia, followed by cooling and washing with water to remove hydrocyanic acid, also is applicable to similar gases, however produced.

What we claim is:—

1. The process of utilizing Steffen's water or the like which comprises concentrating said Steffen's water, subjecting the concentrated material to destructive distillation, in absence of air, whereby gases containing ammonia and allied nitrogenous compounds result, heating these gases to a temperature above a red heat, whereby a part of the nitrogen contained in them is converted into hydrocyanic acid, absorbing the ammonia by treating the gases with an acid, and thereafter recovering the hydrocyanic acid from the gases.

2. A process of separating ammonia and hydrocyanic acid from gases containing the same, which comprises subjecting said gases first to the action of an acid stronger than hydrocyanic, to produce an ammonium salt, and thereafter treating said gases with water to absorb the hydrocyanic acid.

3. A process of separating tar, ammonia and hydrocyanic acid from gases, which comprises first cooling the gases to a temperature at which the tarry matters condense, but which temperature is above that at which water vapor carried by the gases would condense, thereafter washing the gases with an acid, to produce an ammonium salt, and thereafter cooling the gases to a temperature at which the principal part of the water vapor will condense, at which temperature the condensed water will absorb at least a part of the hydrocyanic acid.

In testimony whereof we affix our signatures in presence of two witnesses.

FREDERICK W. HUBER.
ROBERT W. POINDEXTER, Jr.

Witnesses:
 NORMAN MACBETH,
 R. DAN. FRAM.